US012094386B1

(12) United States Patent
Wu

(10) Patent No.: US 12,094,386 B1
(45) Date of Patent: Sep. 17, 2024

(54) DIGITAL LOW COLOR SHIFT EDGE SMOOTHING METHOD AND RELATED DEVICE

(71) Applicant: HIMAX TECHNOLOGIES LIMITED, Tainan (TW)

(72) Inventor: Tung-Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 84 days.

(21) Appl. No.: 18/115,773

(22) Filed: Mar. 1, 2023

(51) Int. Cl.
*G09G 3/00* (2006.01)
*G09G 3/20* (2006.01)

(52) U.S. Cl.
CPC ... *G09G 3/2003* (2013.01); *G09G 2300/0452* (2013.01); *G09G 2320/0666* (2013.01); *G09G 2320/0673* (2013.01); *G09G 2320/068* (2013.01)

(58) Field of Classification Search
CPC ... G09G 2300/0452; G09G 2300/0819; G09G 2320/0209; G09G 2320/0233; G09G 3/2003; G09G 3/2092; G09G 3/3233; G09G 3/3266
See application file for complete search history.

(56) References Cited

U.S. PATENT DOCUMENTS

2018/0293948 A1* 10/2018 Lu ........................ G09G 3/3688
2021/0082361 A1* 3/2021 He ........................ G09G 3/3614

* cited by examiner

*Primary Examiner* — Insa Sadio
(74) *Attorney, Agent, or Firm* — Winston Hsu

(57) ABSTRACT

A digital low color shift (DLCS) edge smoothing method, for a display panel having a plurality of pixels, includes determining an edge gain of a first pixel of the plurality of pixels of the display panel; and smoothing the edge of the first pixel and the other neighbor pixels of the plurality of pixels of the display panel according to a spatial filter.

14 Claims, 6 Drawing Sheets

| | | |
|---|---|---|
| R(x-1,y-1) | R(x,y-1) | R(x+1,y-1) |
| R(x-1,y) | R(x,y) | R(x+1,y) |
| R(x-1,y+1) | R(x,y+1) | R(x+1,y+1) |

Neighbor pixel

Current pixel

LUT_Edgegain

| Value | Gain |
|---|---|
| 0 | 1 |
| 32 | 0.8875 |
| 64 | 0.775 |
| 96 | 0.6625 |
| 128 | 0.55 |
| 160 | 0.4375 |
| 192 | 0.325 |
| 224 | 0.2125 |
| 255 | 0.1 |

FIG. 2

Gamma_LUT

| Level | R | G | B |
|---|---|---|---|
| 0 | 0 | 0 | 0 |
| 1 | 4 | 4 | 4 |
| 2 | 8 | 8 | 8 |
| 3 | 12 | 12 | 12 |
| 4 | 16 | 16 | 16 |
| 5 | 20 | 20 | 20 |
| 6 | 24 | 24 | 24 |
| 7 | 28 | 28 | 28 |
| 8 | 32 | 32 | 32 |
| 9 | 36 | 36 | 36 |

⋮

H LUT

| Level | R | G | B |
|---|---|---|---|
| 1 | 0 | 0 | 0 |
| 2 | 3 | 3 | 3 |
| 3 | 6 | 6 | 6 |
| 4 | 9 | 9 | 9 |
| 5 | 12 | 12 | 12 |
| 6 | 15 | 15 | 15 |
| 7 | 18 | 18 | 18 |
| 8 | 21 | 21 | 21 |
| 9 | 24 | 24 | 24 |

⋮

LUT_Edgegain

| Value | Gain |
|---|---|
| 0 | 1 |
| 32 | 0.8875 |
| 64 | 0.775 |
| 96 | 0.6625 |
| 128 | 0.55 |
| 160 | 0.4375 |
| 192 | 0.325 |
| 224 | 0.2125 |
| 255 | 0.1 |

Gamma_LUT +H_LUT×LUT_Edgegain = gamma_H_VAL

Gamma_LUT -L_LUT×LUT_Edgegain = gamma_L_VAL

H LUT

| Level | R | G | B |
|---|---|---|---|
| 1 | 0 | 0 | 0 |
| 2 | 1 | 1 | 1 |
| 3 | 3 | 3 | 3 |
| 4 | 4 | 4 | 4 |
| 5 | 5 | 5 | 5 |
| 6 | 7 | 7 | 7 |
| 7 | 8 | 8 | 8 |
| 8 | 9 | 9 | 9 |
| 9 | 11 | 11 | 11 |

⋮

FIG. 3

| | | | | |
|---|---|---|---|---|
| SF11 | SF21 | SF31 | SF41 | SF51 |
| SF12 | SF22 | SF32 | SF42 | SF52 |
| SF13 | SF23 | SF33 | SF43 | SF53 |

FIG. 4

| | | | | |
|---|---|---|---|---|
| GN11 | GN21 | GN31 | GN41 | GN51 |
| GN12 | GN22 | GN32 | GN42 | GN52 |
| GN13 | GN23 | GN33 | GN43 | GN53 |

FIG. 5

| | | | | |
|---|---|---|---|---|
| 0.1 | 0.1 | 0.2 | 0.1 | 0.1 |
| 0.1 | 0.2 | 0.5 | 0.2 | 0.1 |
| 0.1 | 0.1 | 0.2 | 0.1 | 0.1 |

FIG. 6

DIGITAL LOW COLOR SHIFT EDGE SMOOTHING METHOD AND RELATED DEVICE

BACKGROUND OF THE INVENTION

1. Field of the Invention

The present invention relates to a digital low color shift (DLCS) edge smoothing method and a related DLCS device, and more particularly, to a digital low color shift (DLCS) edge smoothing method and a related DLCS device capable of improving viewing angle of DLCS.

2. Description of the Prior Art

The conventional vertical alignment (VA) panel has an issue of color shift in brightness and color when a viewing angle is different. A digital low color shift (DLCS) technique is implemented to improve the color shift issue by adjusting gray values of the sub-pixels of the pixels with signal control. The spatial sub-pixels share a digital multi-domain effect, e.g. adjacent sub-pixels are respectively displayed with a high gray value and a low gray value.

However, the bright edge contents occur when the DLCS technique is implemented on the panel. Therefore, improvements are necessary to the conventional technique.

SUMMARY OF THE INVENTION

In light of this, the present invention provides a digital low color shift (DLCS) edge smoothing method and a related DLCS device to improve VA type panel viewing angle.

An embodiment of the present invention discloses a digital low color shift (DLCS) edge smoothing method, for a display panel having a plurality of pixels. The edge smoothing method comprises determining an edge gain of a first pixel of the plurality of pixels of the display panel; and smoothing the edge of the first pixel and the other neighbor pixels of the plurality of pixels of the display panel according to a spatial filter.

Another embodiment of the present invention discloses a digital low color shift (DLCS) edge smoothing device, for a display panel having a plurality of pixels. The DLCS edge smoothing device comprises an edge gain calculation circuit, configured to determine an edge gain of a first pixel of the plurality of pixels of the display panel; and an edge smoothing circuit, configured to smooth the edge of the first pixel and the other neighbor pixels of the plurality of pixels of the display panel according to a spatial filter.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a schematic diagram of an edge calculation according to an embodiment of the present invention.

FIG. 3 is a schematic diagram of a determination of H/L gamma values according to an embodiment of the present invention.

FIG. 4 is a schematic diagram of a pixel (R/G/B) based 5*3 spatial filter according to an embodiment of the present invention.

FIG. 5 is a schematic diagram of edge gains of pixels according to an embodiment of the present invention.

FIG. 6 is a schematic diagram of the spatial filter according to an embodiment of the present invention.

DETAILED DESCRIPTION

Figure 1:
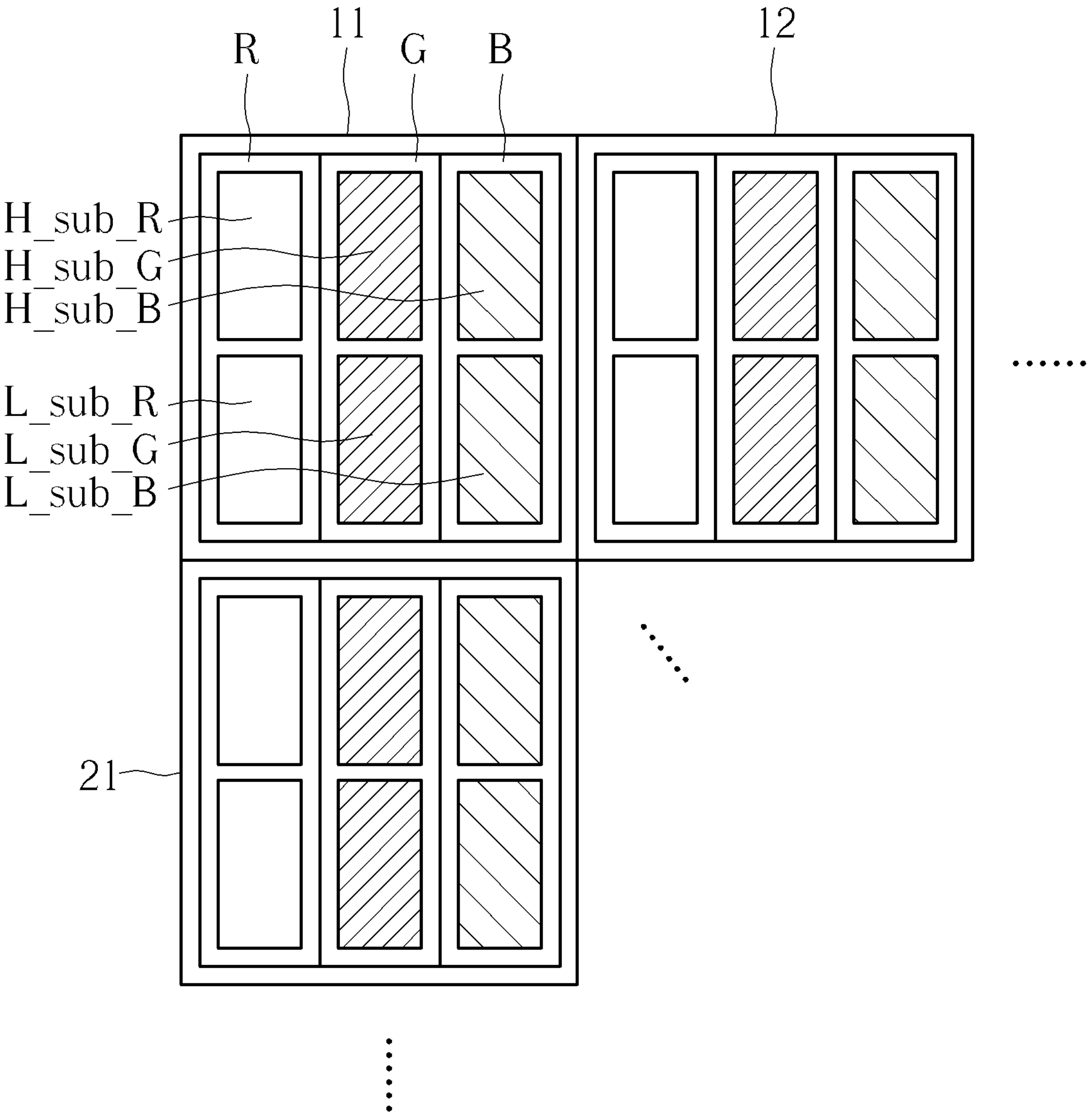
FIG. 1 is a schematic diagram of a pixel configuration of a display panel according to an embodiment of the present invention.
Figure 7:
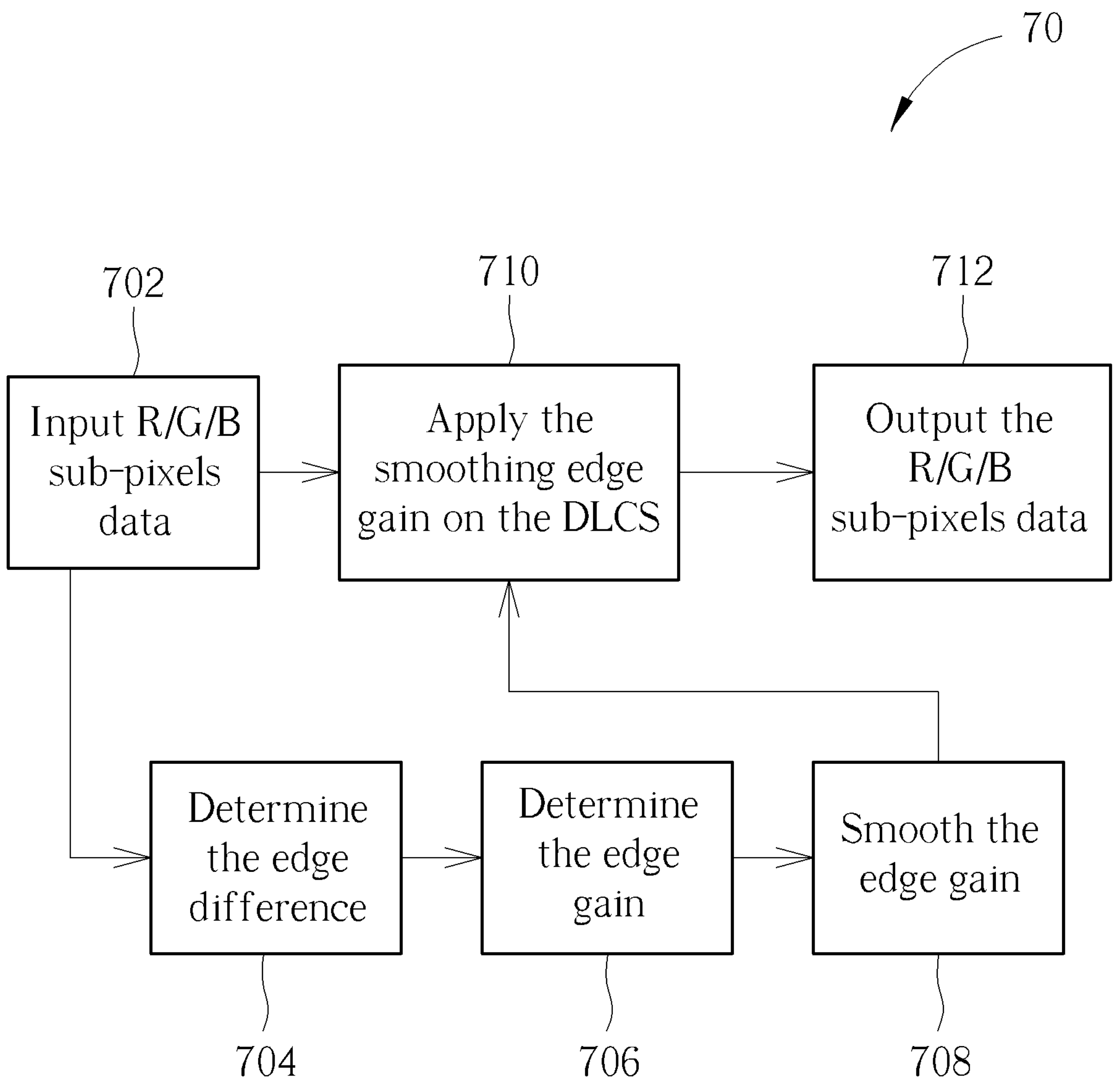
FIG. 7 is a schematic diagram of a DLCS edge smoothing method according to an embodiment of the present invention.

FIG. 1 is a schematic diagram of a pixel configuration of a display panel according to an embodiment of the present invention. The display panel includes a plurality of pixels 11, 12, 21 . . . , and each of the pixels 11, 12, 21 . . . includes a red sub-pixel R, a green sub-pixel B and a blue sub-pixel B. The display panel may be a multi-domain vertical alignment panel, wherein each of the plurality of pixels includes a plurality of pixel data values, e.g. H/L values of digital low color shift (DLCS) technique. That is, each of the red sub-pixels R, the green sub-pixels G and the blue sub-pixels B is composed of a high digital domain and a low digital domain, wherein the high digital domain and the low digital respectively correspond to a first pixel data value H and a second pixel data value L.

When the conventional DLCS technique is implemented on the display panel, the first pixel data value H and the second pixel data value L are almost 0, i.e. bright content, at edge contents. That is, the bright edge occurs at the boundary of the content.

In order to reduce the data pixel value difference between the first pixel data value H and the second pixel data value L to alleviate the bright edge contents, an edge gain is utilized for decreasing a difference of pixel data value between the first pixel data value H and the second pixel data value L.

FIG. 2 is a schematic diagram of an edge calculation according to an embodiment of the present invention. FIG. 2 illustrates a table LUT_Edgegain and a 3*3 block base, i.e. 3*3 pixels, for the edge calculation of each of the R/G/B sub-pixels. In the 3*3 block base, the edge gain of a current pixel R(x,y) is determined to eliminate the bright edge of the displayed content.

First, a plurality of edge differences between the current pixel R(x,y) and each of the neighbor pixels R(x−1,y−1), R(x,y−1), R(x+1,y−1), R(x−1,y), R(x+1,y), R(x−1,y+1), R(x,y+1), R(x+1,y+1) of the 3*3 block base of the display panel are determined. In this example, a data value difference of the sub-pixel values is calculated, and then the edge differences are determined after taking an absolute value of the data value difference respectively. A maximal edge difference corresponding to the R/G/B sub-pixels of the edge differences between the current pixel R(x,y) and each of the neighbor pixels of the 3*3 block base of the display panel is determined.

The edge gain of the current pixel R(x,y) corresponding to each of the R/G/B sub-pixels is determined by looking up the table LUT_Edgegain, as shown in FIG. 2, according to the maximal edge difference. For example, when a maximal edge difference of the R sub-pixel of the current pixel R(x,y) is determined as 128, an edge gain of the R sub-pixel is determined as 0.55 according to the table LUT_Edgegain; when a maximal edge difference of the B sub-pixel of the current pixel R(x,y) is determined as 0, an edge gain of the B sub-pixel is determined as 1 according to the table LUT_Edgegain.

In an embodiment, the determined edge gain is applied to the first pixel data value H and the second pixel data value L of each sub-pixel R/G/B of the pixels. FIG. 3 is a schematic diagram of a determination of H/L gamma values according to an embodiment of the present invention.

A gamma curve table Gamma LUT shows relations of R/G/B sub-pixel values and pixel values of a gamma curve, a high domain lookup table H_LUT shows relations of R/G/B sub-pixel values and the first pixel data value H, a low domain lookup table L_LUT shows relations of R/G/B sub-pixel values and the second pixel data value L, and the table LUT_Edgegain shows relations of R/G/B sub-pixel values and the edge gains.

In an example, when the gamma values of the current pixel is 128 and the edge gain is 0.55 by looking up the table LUT_Edgegain, a high gamma gray value gamma_H_VAL is 128+50*0.55=156 and a low gamma gray value gamma_L_VAL is 128-25*0.55=114 to represent the current pixel R(x,y), and is utilized for the multi-domain vertical alignment type panel.

After the edge gain of the current pixel R(x,y) is determined, a spatial filter is utilized for smoothing the edge of the current pixel R(x,y) and the other neighbor pixels.

FIG. 4 is a schematic diagram of a pixel (R/G/B) based 5*3 spatial filter according to an embodiment of the present invention. FIG. 5 is a schematic diagram of the edge gain of the pixels according to an embodiment of the present invention.

The spatial filter includes a plurality of smooth weighting values SF11-SF53 respectively corresponding to the edge gains GN11-GN53 of the pixels, and is utilized for spreading the edge gains of the pixels spatially.

Take a smooth edge gain GN32_SF for example, the smooth edge gain GN32_SF is determined by formula (1) with the spatial filter:

$$GN32\_SF=(GN11*SF11+GN21*SF21+GN31*SF31+GN41*SF41+GN51*SF51+GN12*SF12+GN22*SF22+GN32*SF32+GN42*SF42+GB52*SF52+GN13*SF13+GN23*SF23+GN33*SF33+GN43*SF43+GN53*SF53)/SUM(SF11:SF53) \quad (1)$$

Similarly, the smooth edge gains of other pixels may be determined according to a weighting effect of the spatial filter. In this example, the spatial filter corresponds to the 5*3 pixels for smoothing corresponding edge gains of the pixels. Notably, the spatial filter is not limited to the 5*3 pixels spatial filter, the spatial filter with other dimensions or weighting values is applicable to the present invention.

FIG. 6 is a schematic diagram of the spatial filter according to an embodiment of the present invention. As shown in FIG. 6, a weighting value of SF32 is 0.5, weighting values of SF31, SF22, SF33, SF42 are 0.2, and weighting values of the rest of the spatial filter are 0.1.

In the example of FIG. 6, the weighting effect of the spatial filter is utilized for spreading the edge gain from the current pixel R(x,y). More specifically, when the edge gain of the current pixel R(x,y) is 1 and the edge gains of the pixels adjacent to the current pixel R(x,y) are all zero, the spatial filter may be utilized for spreading the edge gain of the current pixel R(x,y) to neighbor pixels. Therefore, the bright edge contents are alleviated with the smoothing of the spatial filter.

In another embodiment, when the spatial filter is utilized for multiple pixels of the display panel with edge gains of 0, the edge gains after the smoothing may still present the original edge gains.

Assume that the weighting effect of the spatial filter is shown in FIG. 6, the smooth edge gain GN32_SF is 0.4. A high gamma gray value gamma_H_VAL is 128+50*0.4=148 and a low gamma gray value gamma_L_VAL is 128-25*0.4=118 to represent the current pixel R(x,y), and is utilized for the multi-domain vertical alignment type panel.

Notably, in the example of FIG. 6, a difference between the high gamma gray value gamma_H_VAL and the low gamma gray value gamma_L_VAL is 30, which is reduced from the example in FIG. 2, i.e. 42. In other words, the bright edge contents are reduced with the smoothing weight effect of the spatial filter accordingly.

An operation of the DLCS edge smoothing process may be summarized to a DLCS edge smoothing method 70 for the display panel. The DLCS edge smoothing method 70 includes the following steps:

Step 702: Input R/G/B sub-pixels data;
Step 704: Determine the edge difference;
Step 706: Determine the edge gain;
Step 708: Smooth the edge gain;
Step 710: Apply the smoothing edge gain on the DLCS;
Step 712: Output the R/G/B sub-pixels data.

Please refer to the above embodiments for the operation of the DLCS edge smoothing method 70, which is not narrated herein again.

Figure 8:
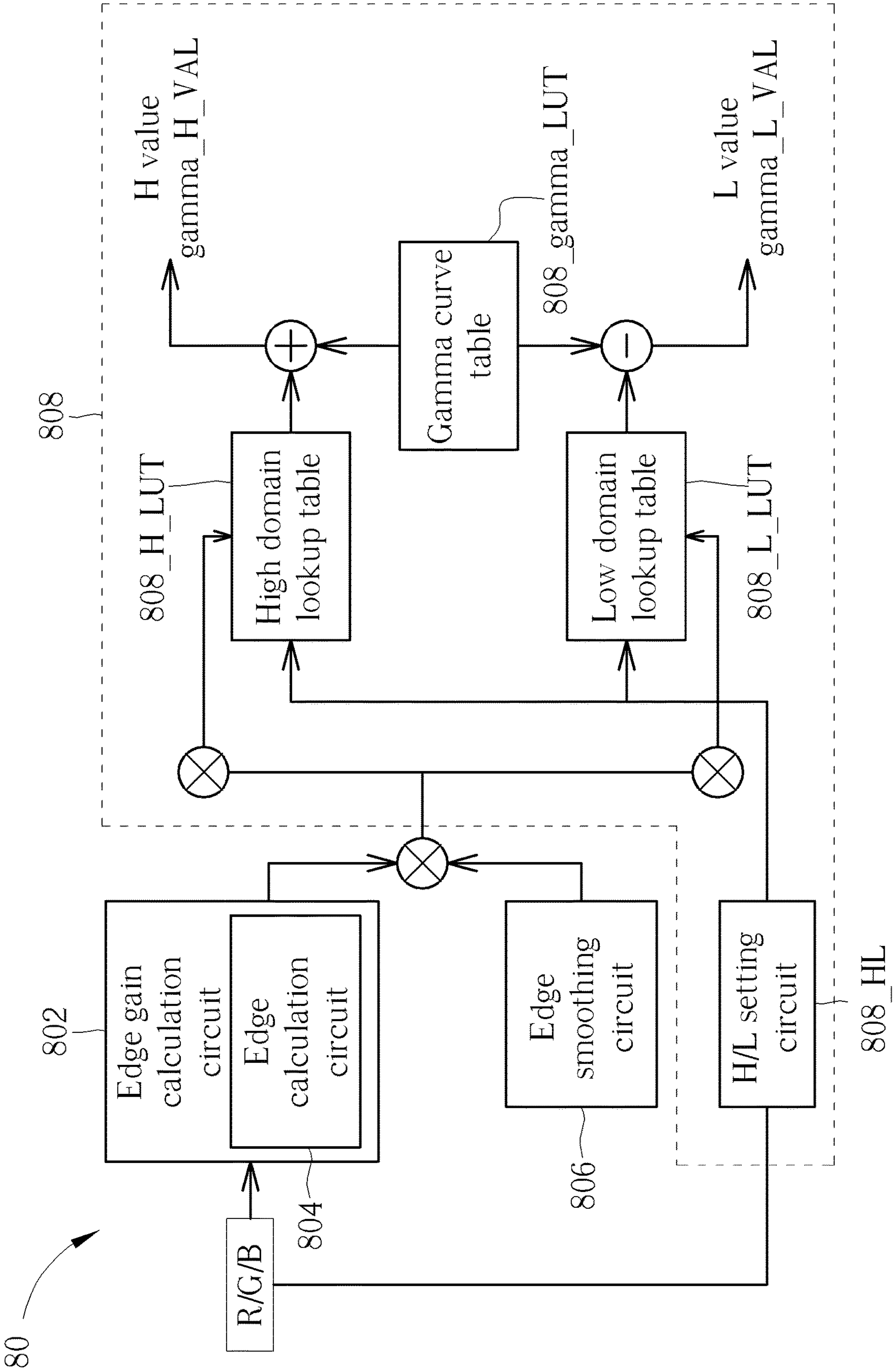
FIG. 8 is a schematic diagram of a DLCS edge smoothing device according to an embodiment of the present invention.

In addition, the DLCS edge smoothing method 70 may be implemented on a timing controller of the display panel. Please refer to FIG. 8, which is a DLCS edge smoothing device 80 according to an embodiment of the present invention. The DLCS edge smoothing device 80 includes an edge gain calculation circuit 802, an edge calculation circuit 804, an edge smoothing circuit 806 and a DLCS circuit 808.

The edge gain calculation circuit 802 is configured to determine the edge gain of the current pixel R(x,y). The edge calculation circuit 804 is configured to determine the edge differences between the current pixel R(x,y) and each of the neighbor pixels of the display panel, and to determine the edge gain of the current pixel R(x,y) according to the maximal edge difference of the edge differences between the current pixel R(x,y) and each of the neighbor pixels of the display panel.

The edge smoothing circuit 806 is configured to smooth the edge of the current pixel R(x,y) and the other neighbor pixels of the plurality of pixels of the display panel according to the spatial filter.

The DLCS circuit 808 includes an H/L setting circuit 808_HL, a high domain lookup table 808_H_LUT, a low domain lookup table 808_L_LUT and a gamma curve table 808_Gamma_LUT, wherein the H/L setting circuit 808_HL is a setting map of corresponding pixels of the display panel, e.g. the high gamma gray value gamma_H_VAL and the low gamma gray value gamma_L_VAL are in staggered distribution. The DLCS circuit 808 is configured to determine the high gamma gray value gamma_H_VAL of the high digital domain according to the edge gain of the current pixel R(x,y) of the pixels of the display panel, and to determine the low gamma gray value gamma_L_VAL of the low digital domain according to the edge gain of the current pixel R(x,y) of the pixels of the display panel.

Notably, those skilled in the art may properly design the DLCS edge smoothing method and the DLCS edge smoothing device according to different requirements, e.g. the weighting values and the weighting effect of the spatial filter, the dimension of the spatial filter, which are applicable to the present invention and not limited thereto.

In summary, the present invention provides a digital low color shift (DLCS) edge smoothing method and related DLCS edge smoothing device, which performs the smoothing for edge contents to improve VA type panel viewing angle.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A digital low color shift (DLCS) edge smoothing method, for a display panel having a plurality of pixels, the edge smoothing method comprising:

determining an edge gain of a first pixel of the plurality of pixels of the display panel; and smoothing the edge of the first pixel and the other neighbor pixels of the plurality of pixels of the display panel according to a spatial filter.

2. The DLCS edge smoothing method of claim 1, wherein the step of smoothing the edge of the first pixel and the other neighbor pixels of the plurality of pixels of the display panel according to the spatial filter comprises:

determining a smoothing edge gain of the first pixel of the plurality of pixels of the display panel according to the edge gain of the first pixel and a smoothing weighting of the spatial filter.

3. The DLCS edge smoothing method of claim 2, wherein the smoothing weighting of the spatial filter is determined according to an edge effect of the first pixel and neighbor pixels of the plurality of pixels of the display panel.

4. The DLCS edge smoothing method of claim 2, wherein the step of determining the edge gain of the first pixel of the plurality of pixels of the plurality of pixels of the display panel comprises:

determining a plurality of edge differences between the first pixel and each of the neighbor pixels of the plurality of pixels of the display panel; and determining the edge gain of the first pixel according to a maximal edge difference of the plurality of edge differences between the first pixel and each of the neighbor pixels of the plurality of pixels of the display panel.

5. The DLCS edge smoothing method of claim 4, wherein the edge gain is determined by looking up an edge gain lookup table according to the maximal edge difference.

6. The DLCS edge smoothing method of claim 2, further comprising:

determining a high gamma gray value of the high digital domain of the each of the plurality of pixels according to the smoothing edge gain of the first pixel of the plurality of pixels of the display panel; and determining a low gamma gray value of the low digital domain of the each of the plurality of pixels according to the smoothing edge gain of the first pixel of the plurality of pixels of the display panel a.

7. The DLCS edge smoothing method of claim 1, wherein the each of the plurality of pixels includes a plurality of red sub-pixels, a plurality of green sub-pixels and a plurality of blue sub-pixels, and each of the plurality of red sub-pixels, the plurality of green sub-pixels and the plurality of blue sub-pixels is composed of a high digital domain and a low digital domain, wherein the high digital domain and the low digital respectively correspond to a first pixel data value and a second pixel data value.

8. A digital low color shift (DLCS) edge smoothing device, for a display panel having a plurality of pixels, the DLCS edge smoothing device comprising:

an edge gain calculation circuit, configured to determine an edge gain of a first pixel of the plurality of pixels of the display panel; and an edge smoothing circuit, configured to smooth the edge of the first pixel and the other neighbor pixels of the plurality of pixels of the display panel according to a spatial filter.

9. The DLCS edge smoothing device of claim 8, wherein the edge smoothing circuit is configured to determine a smoothing edge gain of the first pixel of the plurality of pixels of the display panel according to the edge gain of the first pixel and a smoothing weighting of the spatial filter.

10. The DLCS edge smoothing device of claim 9, wherein the smoothing weighting of the spatial filter is determined according to an edge effect of the first pixel and neighbor pixels of the plurality of pixels of the display panel.

11. The DLCS edge smoothing device of claim 9, further comprising:

an edge calculation circuit, configured to determine a plurality of edge differences between the first pixel and each of the neighbor pixels of the plurality of pixels of the display panel; and to determine the edge gain of the first pixel according to a maximal edge difference of the plurality of edge differences between the first pixel and each of the neighbor pixels of the plurality of pixels of the display panel.

12. The DLCS edge smoothing device of claim 11, wherein the edge gain is determined by looking up an edge gain lookup table according to the maximal edge difference.

13. The DLCS edge smoothing device of claim 8, further comprising:

a DLCS circuit, configured to determine a high gamma gray value of the high digital domain of the each of the plurality of pixels according to the smoothing edge gain of the first pixel of the plurality of pixels of the display panel; and to determine a low gamma gray value of the low digital domain of the each of the plurality of pixels according to the smoothing edge gain of the first pixel of the plurality of pixels of the display panel.

14. The DLCS edge smoothing device of claim 8, wherein the each of the plurality of pixels includes a plurality of red sub-pixels, a plurality of green sub-pixels and a plurality of blue sub-pixels, and each of the plurality of red sub-pixels, the plurality of green sub-pixels and the plurality of blue sub-pixels is composed of a high digital domain and a low digital domain, wherein the high digital domain and the low digital respectively correspond to a first pixel data value and a second pixel data value.

* * * * *